United States Patent [19]

Maury et al.

[11] Patent Number: 4,893,207

[45] Date of Patent: Jan. 9, 1989

[54] MAGNETIC WRITING AND OPTICAL READING HEAD FOR A DATA CARRIER

[75] Inventors: Christian Maury, Voisins le BX; Dan-Tam Pham, Bagneux; Jean-Marie Richard, Houilles, all of France

[73] Assignee: Bull S.A., Paris, France

[21] Appl. No.: 138,863

[22] Filed: Dec. 29, 1987

[30] Foreign Application Priority Data

Dec. 30, 1986 [FR] France .................................. 86 18321

[51] Int. Cl.$^4$ .......................... G11B 5/127; G11B 5/60
[52] U.S. Cl. ..................................... 360/114; 360/103
[58] Field of Search ................. 360/114, 103, 105, 106

[56] References Cited

U.S. PATENT DOCUMENTS

| | | | |
|---|---|---|---|
| 4,219,853 | 8/1980 | Albert et al. | 360/103 |
| 4,510,544 | 4/1985 | Lazzari | 360/114 |
| 4,571,648 | 2/1986 | Barski | 360/105 |
| 4,618,901 | 10/1986 | Hatakeyama et al. | 360/114 |
| 4,633,450 | 12/1986 | Gueugnon | 360/114 |

FOREIGN PATENT DOCUMENTS

0115458 8/1984 European Pat. Off. .

OTHER PUBLICATIONS

Schedewie, "Optically Sensitive Magnetic Head," IBM TDB, vol. 27, No. 6, Nov. 1984, pp. 3479-3480.
Patent Abstracts of Japan, vol. 10, No. 195 (P-475) [2251], Jul. 9, 1986; JP-A-61 39 251 (Sony Corp.) 02-2-5-1986.

*Primary Examiner*—John H. Wolff
*Assistant Examiner*—Matthew J. Bussan
*Attorney, Agent, or Firm*—Kerkam, Stowell, Kondracki & Clarke

[57] ABSTRACT

A magnetic writing and optical reading head for a magnetic data carrier including at least one optical focusing device ($SOI_1$, $SOI_1$) for focusing a beam of light onto the carrier, and a magnetic writing transducer ($TMI_1$, $TMI_2$) disposed on the same rail ($PI_1$, $PI_2$) of the head as the optical device. According to the invention, the head is characterized in that the optical device and the transducer are disposed in the immediate vicinity of one another at a distance d less than the ratio of the difference between the width of the track $L_p$ and the diameter D of the beam of light produced by the device ($SOI_1$, $SOI_2$) to twice the sine of the maximum azimuth angle $\psi_M$. The invention is applicable to magnetooptical disk memories.

12 Claims, 4 Drawing Sheets

MAGNETIC WRITING AND OPTICAL READING HEAD FOR A DATA CARRIER

FIELD OF THE INVENTION

The present invention relates to a magnetic writing and optical reading head for a data carrier. More particularly, it is applicable to the reading and writing of data on the magnetic disks of a magnetooptical disk memory.

BACKGROUND OF THE INVENTION

It is known that magnetooptical disk memories are memories in which the data are recorded on magnetic disks and read with optoelectronic devices. These memories are being used to an ever increasing extent, because they make it possible to obtain high radial and longitudinal densities, on the order of several thousand tracks per cm radially and 100,000 data per cm longitudinally. (The radial density is the number of tracks per unit of length, measured along the diameter of the disk, while the longitudinal density is the number of data per unit of length measured along the circumference of a track.)

The manner in which magnetooptical disk memories function is based on the magnetooptical effect, which relates to the interaction of a light, polarized rectilinearly, with the magnetic state of the material comprising the recording layer of the magnetic disks. Further details on the magnetooptic effect and on the manner in which data contained on magnetic disks in a magnetooptical memory can be read are disclosed in U.S. Pat. No. 4,510,544 assigned to the assignee of the present invention.

For the sake of simplicity, the means that enable either writing or recording of the data on the disks or reading thereof are called transducers or sensors. Typically one or more transducers (or sensors) are linked with one face of a given disk, and the disk revolves past the transducer or transducers.

One of the current trends in the development of magneto optical disk memories is toward memories in which the data are written on the magnetic disks by magnetic transducers, the reading being performed by an optoelectronic device including a rather complex optical focusing device linked to photoelectronic transducers and circuits for amplifying the signals emitted by these transducers. With these optoelectronic devices, it is thus possible to observe one face of a disk by means of a beam of polarized light at a given moment, in a given site, and to emit an electrical signal the voltage (or current) of which is a function of the data located at this site.

Magnetic transducers used for writing the data are described in French Patent Application 84 200 25, filed on Dec. 28, 1984 and corresponding U.S. Patent Application, Ser. No. 813,236, both of which are assigned to the assignee of the present invention.

U.S. Pat. No. 4,633,450, assigned to the assignee of the present invention describes a magnetic writing and optical reading head for magnetooptical disk units in which the writing is performed by a magnetic transducer, and the reading is performed by an optical focusing device placed inside a recess provided inside the head. This head is called the "main body" and is of the low-charge Winchester type and is, for example, comprised by a catamaran including at least two runners (also known as rails or skis, in the terminology used by those skilled in the art) and a groove disposed between them.

The focusing optical element is placed in a recess provided inside one of the two runners. This reading and writing head flies above the data carrier at a distance, known as the flight altitude, which is on the order of several tenths of a micrometer. Hence the focusing optical element is located at a distance from the data carrier that is greater than or equal to this flight altitude. Thus because of the same fact of the conditions of flight of the head above the disk, which keep the face of the head that faces the disk at a constant distance from it, it is understood that in suitably disposing the focusing optical element inside the head, the distance between this optical element and the disk can be made constant during the entire time of the flight of the head above the disk.

It is thus possible to avoid using an extremely heavy and expensive device for automatic focusing.

In a preferred embodiment of the above-described head, the magnetic transducer and the focusing device (which is also known as an optical sensor) are located on the same rail.

The head is mounted at the end of a suspension arm, which in turn is mechanically connected to the movable portion of a linear or rotary actuator. To make magnetooptic disk memories less bulky, it is preferable to use rotary actuators, because they need less electrical energy than a linear actuator, and they are smaller in size. A rotary actuator of this kind is described in U.S. Pat. No. 4,571,648, assigned to the assignee of the present invention, and includes an assembly that is movable to rotate about an axis that is parallel to the axis of rotation of the magnetic disk and is located outside the disk. When the rotary actuator is displaced, the head structurally connected with the support arm is displaced above the disk, describing a circular arc.

When the reading and writing head is located above any one of the tracks of the disk, its longitudinal axis forms an angle $\psi$ with the tangent to the track. This angle, known as the azimuth angle, varies depending on the track above which the head is located. Thus if the head is displaced from the outside track located on the periphery of the disk to the inside track closest to the center of the disk, this angle $\psi$ can vary, for example between $-7$ and $+7°$. It will be understood that the variations of this angle are a function of geometrical arrangements relating to the disk and to the assembly formed by the rotary actuator, the suspension arm and the head. Since by construction the magnetic transducer and the focusing device have a common longitudinal axis of symmetry and this axis is parallel to the longitudinal axis of the flying head, the following conditions obtain:

For typical distances separating the optical axis of the optical focusing device and the axis of symmetry of the writing pole of the magnetic transducer (perpendicular to the track), that is, several tenths of a millimeter to one millimeter, there is a positional spacing with respect to the tracks of the disk, between the magnetic writing transducer and the optical focusing device. Thus if the writing pole of the magnetic transducer is located facing a track having the ordinal number i, the focusing optical element is located facing the track having the ordinal number j, where i is different from j. For a distance between the optical axis of the optical focusing device and the writing pole of the transducer on the order of a millimeter, this positional spacing (i −j) is on the order of several tens of tracks.

This entails the following disadvantage:

It is not possible to reread the data written by the magnetic transducer using the optical reading device including the focusing optical element immediately after these data have been written, when this operation is currently performed in the classical disk memories, which typically and as is well known include only a single magnetic transducer for both reading and writing. Thus all the data must first be written on one track by means of the transducer and then once these writing operations are terminated, the writing and reading head must be displaced in such a manner that the optical focusing device is located facing the track which has just been written upon. In this case, two position control systems must be used, one for the writing operations and the other for the reading operations. Each of these devices has its own device for measurement of position (in fact, if only the single optical device including the focusing optical element is used for measuring the position of the head above the disk, then it is certainly possible to know the position of this focusing optical element with respect to the disk, but the position of the magnetic writing transducer will not be known, since the positional spacing between the magnetic transducer and the focusing optical element with respect to the tracks varies, depending on the position occupied by the head above the disk). Using two position control systems is expensive and complicated. Moreover, the operations of writing data and the operations of rereading these data are obviously relatively lengthy, in any case much lengthier than the operations of writing and rereading data in classical disk memories.

OBJECT AND SUMMARY OF THE INVENTION

The present invention makes it possible to overcome these disadvantages by providing a magnetic writing and optical reading head for a data carrier that is extremely compact, small in size and very lightweight, in which the relative disposition of the magnetic transducer and the optical reading element is such that any positional spacing between the magnetic transducer and the optical reading element with respect to the tracks is reduced substantially.

According to the invention, the magnetic writing and optical reading element for a magnetic data carrier, flying above the data carrier and being of the low-charge type, including at least two rails and a groove disposed between them, and including at least one optical device for focusing a beam of light on the carrier and one magnetic writing transducer disposed on the same rail as the optical focusing device, the optical device and the magnetic transducer having the same longitudinal axis, is characterized in that, with the object of rereading the data immediately after having written them, by reducing the effects of the azimuth angle between said longitudinal axis and the tangent to the track written upon by the transducer, the optical device and the transducer are disposed in the immediate vicinity of one another, such that the distance d between the optical axis of the optical focusing device and the axis of the writing pole of the transducer, perpendicular to the carrier, is strictly less than the ratio of the difference between the width $L_p$ of the tracks written upon by the transducer and the diameter D of the spot of light produced by the focusing optical element to twice the sine of the maximum azimuth angle.

In a preferred embodiment of the invention, this distance d is between 2 and 4 micrometers.

The magnetic writing and optical reading head is produced by very large scale integration (VLSI) techniques, which applies both to the rails and the groove and to the magnetic writing transducer and the focusing optical element. The focusing optical element may for example be an integrated optical element terminating in the form of a wave guide.

Further characteristics and advantages of the present invention will become apparent from the ensuing detailed description, provided by way of non-limiting examples, taken in conjunction with the drawings.

BRIEF DESCRIPTION OF THE DRAWINGS

FIG. 1, including

FIG. 3, comprising

FIG. 6, comprising

DESCRIPTION OF THE PREFERRED EMBODIMENT

Figures 1A, 1B:
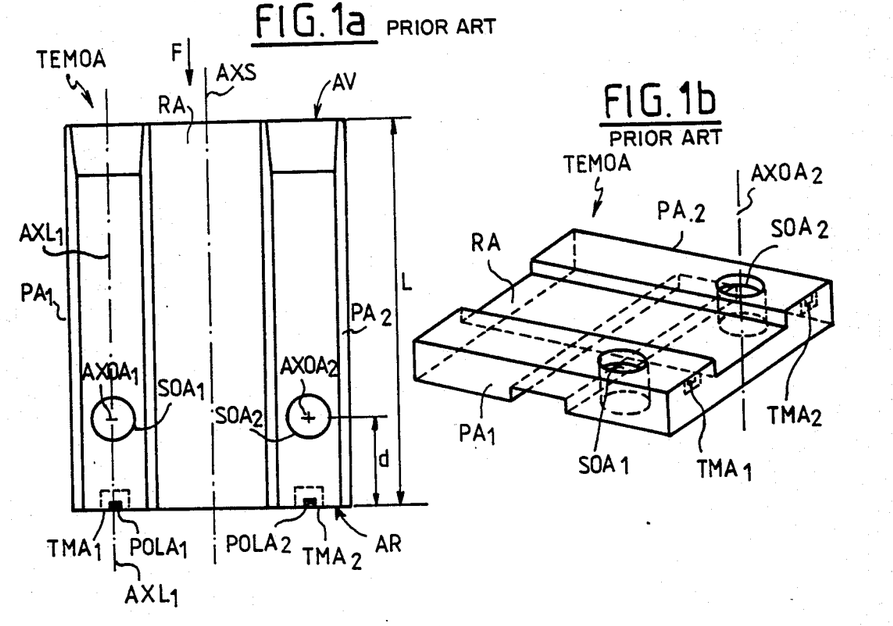
Figs. 1a and 1b, shows a magnetic writing and optical reading head for a data carrier in accordance with the prior art, as described in the aforementioned European Patent Application.
Figure 2:
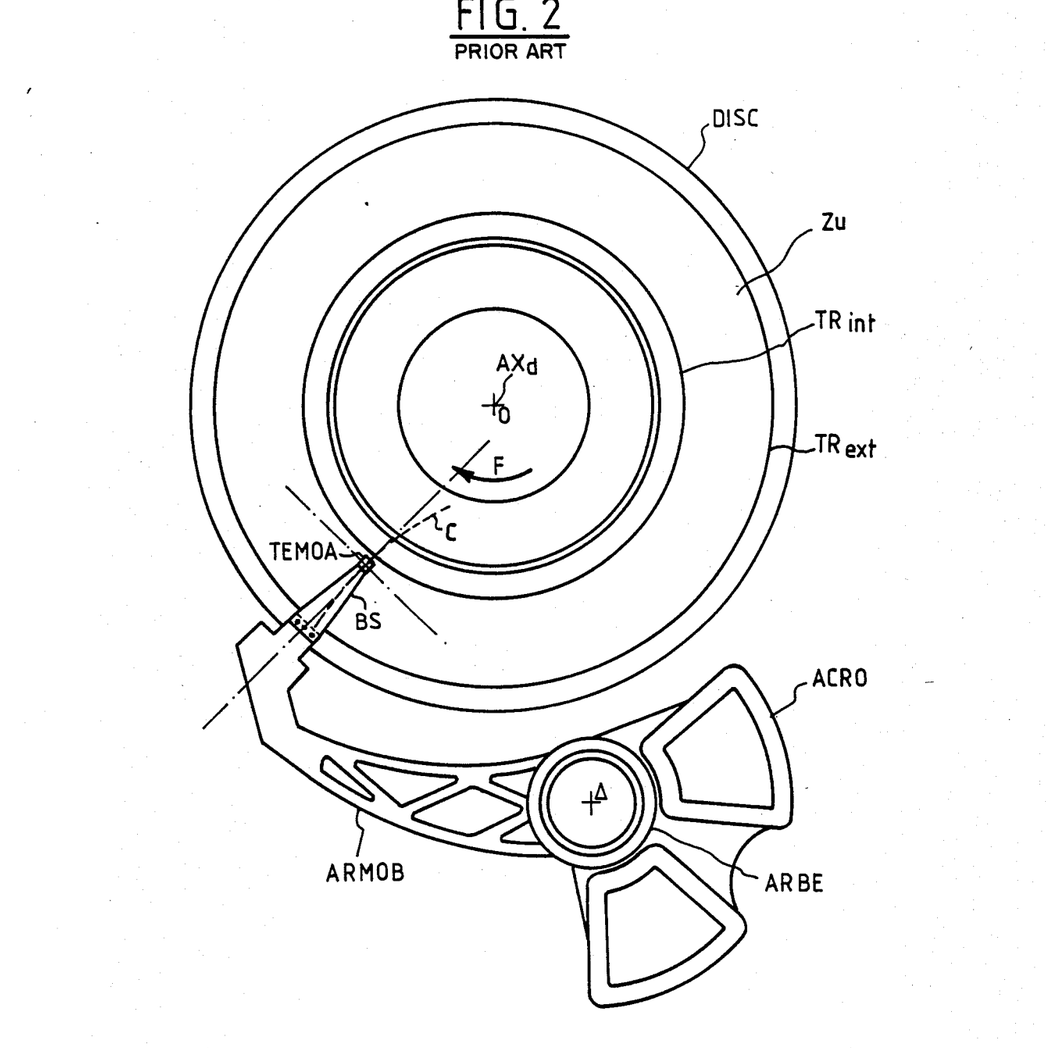
FIG. 2 is a view from above showing the relative position of a rotary actuator and a magnetic disk, in which the head shown in FIG. 1 is shown at the end of a suspension arm structurally connected to this rotary actuator.
Figure 3A:
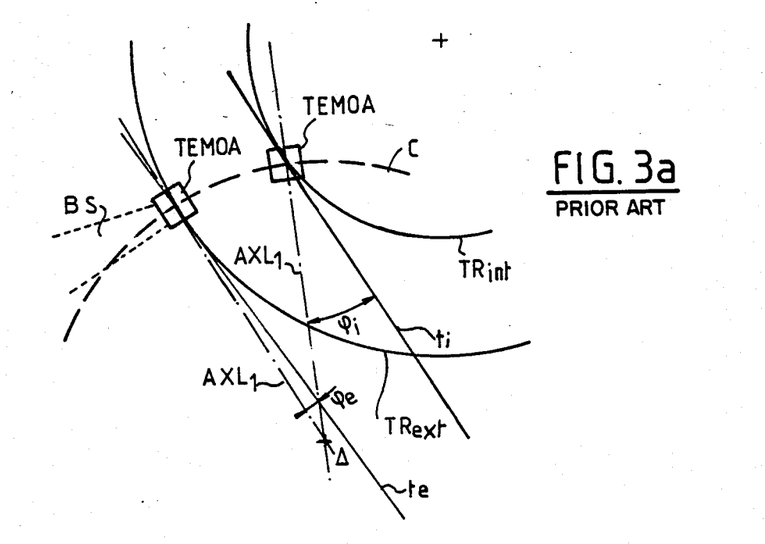
FIGS. 3a and 3b, illustrates the consequences resulting from the relative disposition of the head shown in FIG. 1 and the tracks of the disk for the positional spacing between the writing pole of the magnetic transducer and the optical focusing device with respect to the tracks of disk, when the head is structurally connected to a rotary actuator.
Figure 3B:
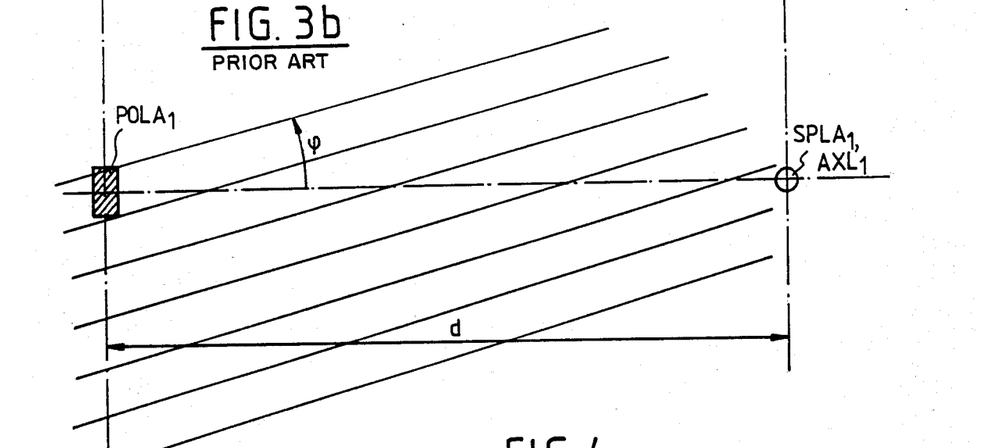

For better understanding of how the magnetic writing and optical reading head of a data carrier according to the invention is constituted, it will be useful to consider the prior art shown in FIGS. 1, 2, 3, which show a head of this kind in the prior art (FIG. 1) as it is disposed with respect to the disk when it is structurally connected to a rotary actuator (FIG. 2), the resultant consequences in the relative position of the overall head with respect to the disk tracks (FIG. 3a), and the relative position of the writing pole of the magnetic transducer and the optical focusing device with respect to the disk tracks (FIG. 3b).

Turning now to FIG. 1, a flying magnetic writing and optical reading head TEMOA for a data carrier which revolves in the direction of the arrow F is shown. The head is assumed to be of the catamaran type, that is, including two rails $PA_1$ and $PA_2$ separated by a groove RA. The portion of the flying head which chronologically is first to see the data travelling past it is called the front AV, while the portion of the head that is chronologically last to see the data travelling past it is called the rear AR. The axis of longitudinal symmetry of the platform (that is, the axis parallel to the direction of travel F of the data) is called AXS.

The head TEMOA includes two optical focusing devices, for example, $SOA_1$ and $SOA_2$ disposed in recesses made inside the rails $PA_1$ and $PA_2$, respectively. (It will of course be understood that the flying head may contain only a single optical focusing device, for example $SOA_1$ disposed inside the rail $PA_1$.)

Each of the optical focusing devices has a mass of approximately one gram, which is substantially equivalent to that of the remainder of the head.

The head TEMOA also includes two magnetic writing transducers $TMA_1$ and $TMA_2$ disposed at the rear AR of the head, respectively on each of the rails $PA_1$ and $PA_2$.

By construction, the axis of longitudinal symmetry of the focusing device $SOA_1$ ($SOA_2$) coincides with the axis of longitudinal symmetry of the magnetic writing transducer $TMA_1$ (or $TMA_2$). If $AXL_1$ is considered the axis of longitudinal symmetry that is common to the elements $SOA_1$ and $TMA_1$, then it is parallel to the axis of symmetry AXS.

The distance d between the optical axis $AXOA_1$ of the optical device $SOA_1$ and the writing pole $POLA_1$ of the magnetic transducer $TMA_1$ is several tenths of a millimeter or even one millimeter.

FIG. 2 will now be described.

For the reasons given above, it is preferable for the flying head TEMOA to be mounted at the end of a suspension arm BS which in turn is connected to the movable part ARMOB of a rotary actuator ACRO. The rotary actuator ACRO is of the type described in the aforementioned U.S. Pat. No. 4,571,648. It includes a rotational drive shaft ARBE having an axis of rotation located clearly outside the disk DISC. The disk DISC rotates in the direction of the arrow F about its axis of rotation $AX_d$. It includes a usable recording zone $Z_u$ disposed between an outer track $TR_{ext}$ disposed on the periphery of the disk and an inner track $TR_{int}$ disposed in the vicinity of the center O of the disk. This useful zone $Z_u$ includes several thousand tracks. The width $L_p$ of a track is on the order of 3 micrometers; that is, it is of an order of magnitude about ten times smaller than the width of the tracks written upon in the classical magnetic disk memories. The written-on tracks are contiguous, which is not the case in the classical magnetic disks.

When the flying head TEMOA is displaced by means of the rotary actuator ACRO, it described an arc of a circle C above the useful zone $Z_u$ of the disk DISC.

FIG. 3a will now be described.

In this figure, the flying head TEMOA is shown on the one hand facing the outer track $TR_{ext}$ and on the other hand facing the inner track $TR_{int}$.

If one assumes that the data have been written by the transducer $TMA_1$, it is in fact the rail $PA_1$ that is located facing the track that has just been written upon.

Thus if the rail $PA_1$ is located facing the outer track $TR_{ext}$, then the above-defined axis $AXL_{ext}$ forms an angle $\psi_e$ with the tangent $t_e$ to the track (the dimensions of the track are assumed to be negligible by comparison with the rail $PA_1$).

Similarly, when the rail $PA_1$ is disposed facing the inner track $TR_{int}$, the axis $AXL_1$ forms an angle $\psi_i$ with the tangent $t_1$ to the inner track.

It is apparent that when the flying head is displaced from the outer track toward the inner track, describing the circular arc C, the axis of symmetry $AXL_1$ of the system comprising the optical focusing device $SOA_1$ and the magnetic transducer $TMA_1$ forms an azimuth angle $\psi$ with the tangent to the track varying between the values $\psi_e$ and $\psi_i$.

Depending on the relative positions of the axes of rotation $\Delta$ and $AX_d$ of the rotary actuator and disk, and depending on the geometrical dimensions of the rotary actuator and disk, the azimuth angle $\psi$ can vary, for example between $-7°$ and $+7°$.

FIG. 3b will now be described, where a relatively large value has voluntarily been assigned to $\psi$, to make the drawing clearer.

In this drawing, the relative positions with respect to the various tracks of the disk, have been shown for the writing pole $POLA_1$ of the magnetic transducer $TMA_1$ (it is assumed for example that this transducer is of the type described in U.S. Patent Application 813,236) and the spot of light $SPLA_1$ produced by the optical focusing device $SOA_1$ on the surface of the disk DISC. If it is assumed that the distance d between the optical axis $AXOA_1$ of the optical focusing device $SOA_1$ and the writing pole $POLA_1$ of the transducer $TMA_1$ is on the order of a millimeter, then the transducer writes the data on the track having the ordinal number i, the spot of light $SPLA_1$ being located facing the track j, where (i $-$j) is on the order of several tens, this number varying continuously as the head TEMOA is displaced along the circular arc C.

If it is desired to write data by means of the magnetic transducer $TMA_1$ when the spot of light $SPLA_1$ is located above any track having an ordinal number j, it is practically impossible to know which track the writing pole $POLA_1$ will be located above by determining the position of the flying head TEMOA by means of the optical reading device $SOA_1$ and the spot of light $SPLA_1$. In this case, as referred to above, two different position control systems must be provided, one linked with the magnetic writing transducer and the other with the optical reading device $SOA_1$. Additionally, and as also described above, it is impossible to reread the track that has just been written by the tranducer $TMA_1$ by means of the reading device $SOA_1$ immediately after these data have been written by the writing transducer.

Figure 4:
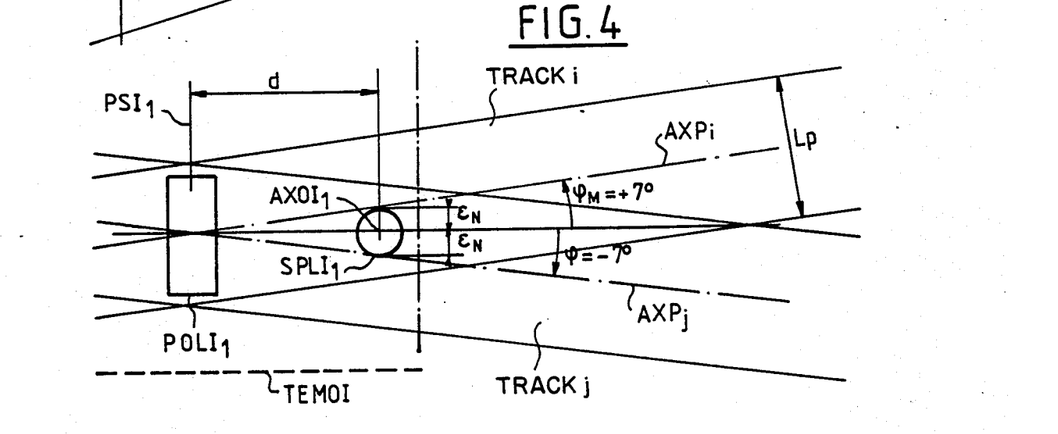
FIG. 4 is a simplified drawing showing a magnetic writing and optical reading head according to the invention, more particularly showing the writing pole of the magnetic transducer and the focusing optical element, seen in section in a plane parallel to the data carrier.
Figures 6A, 6B:
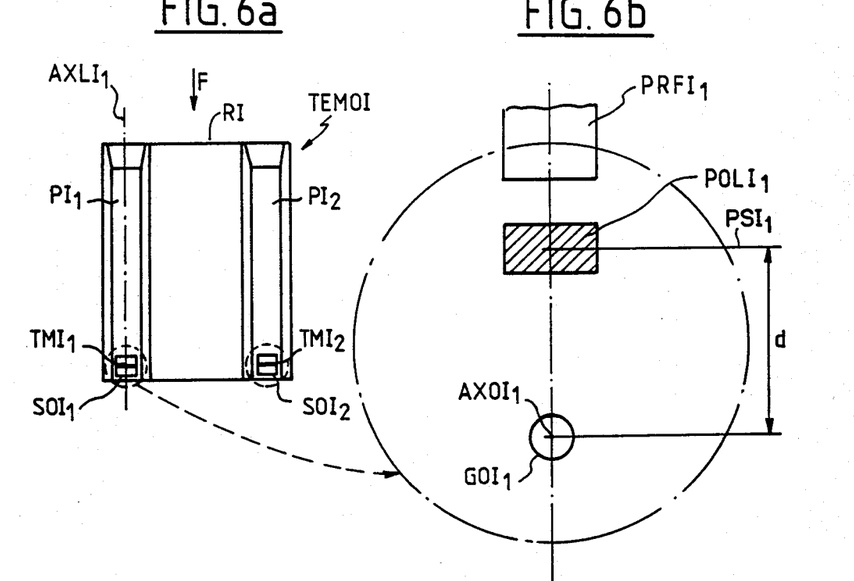
FIG. 6a and 6b, is a view from below, seen from the magnetic disk, showing a magnetic writing and optical reading head according to the invention, showing how the magnetic transducer and the optical focusing device are arranged with respect to the overall head.
Figure 7:
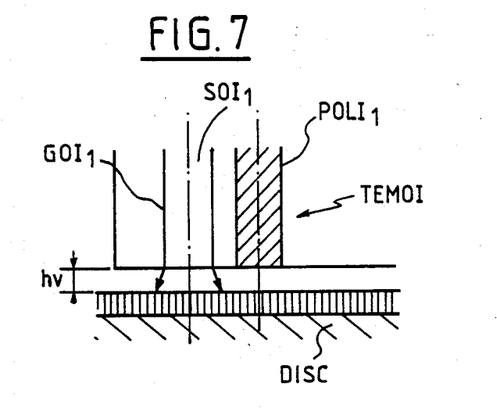
FIG. 7 is a view in longitudinal section, taken along a plane perpendicular to the magnetic disk parallel to the direction of disk travel, showing the relative disposition of the optical focusing device and the writing pole of the magnetic transducer.

The flying magnetic writing and optical reading head of a data carrier according to the invention, shown in FIGS. 4, 6 and 7, makes it possible to overcome the above-described disadvantages.

The flying magnetic writing and optical reading head of a data carrier according to the invention, that is, TEMOI, is such that the writing $POLI_1$ ($POLI_2$) of the magnetic writing transducer $TMI_1$ ($TMI_2$) and the optical device $SOI_1$ ($SOI_2$) are disposed at the rear of the flying head, with the writing head $POLI_1$ ($POLI_2$) and the optical device $SOI_1$ ($SOI_2$) disposed both on the same rail $PI_1$, with their common longitudinal axis shown as $AXLI_1$. As the memory, the flux return pole PRFI₁ of the transducer TMI has been shown in FIG. 6b. The optical focusing device SOI₁ (SOI₂) is embodied in the form of an integrated optical element preferably including a terminal wave guide GOI₁ (GOI₂) producing the spot of light (SPLI₁) at the exit of the device. The distance d between the optical axis AXOI₁ of the wave guide GOI₁ (GOI₂) and the axis of symmetry PSI₁ (PSI₂) of the writing pole POLI₁ (POLI₂) of the magnetic transducer TMI₁ (TMI₂) that is perpendicular to the data carrier is such that the pole POLI₁ and the light spot SPLI₁ are disposed facing the same track of the disk DISC, no matter what the value of the azimuth angle $\psi$. (The wave guide and the light spot have the same axis of symmetry perpendicular to the data carrier.) In other words, when the head TMOI is displaced on the circular arc C, the pole POLI₁ and the light spot SLPI₁ are always disposed facing the same track, no matter what the position of the head TEMOI above the disk. Thus, no matter what this position is, the data written by the writing head POLI₁ can be reread by the optical device SOI₁ immediately after they have been written. The access time for the data written on the disk DISC is thus improved considerably, while retaining the option of rewriting data considered to be erroneous immediately after they have been detected as erroneous by the optical reading device SOI₁. This is highly important for writing data in a magnetooptical memory, where the rough error rate is not negligible, and is estimated to be on the order of $10^{-5}$ (that is, one error datum for $10^5$ data written).

Figure 5:
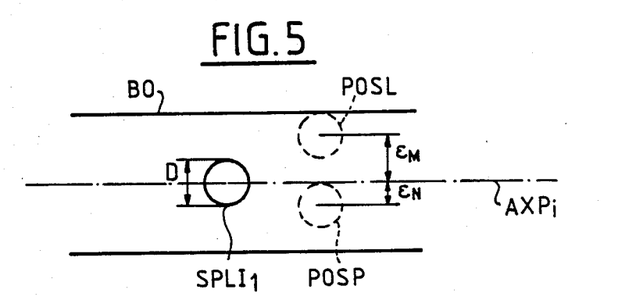
FIG. 5 shows the maximum spacing tolerated, and the normal spacing used in the invention existing between the position of the optical focusing device and the axis of longitudinal symmetry of any track of the disk, for a maximum value of the azimuth angle.

The manner in which the distance d between the plane of symmetry PSI₁ and the axis AXOI₁ is determined is shown more particularly in FIGS. 4 and 5.

The track having the ordinal number i, the axis of symmetry of which, more generally known as the middle line, is $AXP_i$, will now be considered. The width of the track is $L_p$. It is assumed that the azimuth angle $\psi$ has a maximum value $\psi_M$. The distance d must be such that the writing pole POLI₁ and the spot SPLI₁ are disposed facing the same track having the ordinal number 1. The symbol E represents the distance between the axis AXOI₁ of the light spot SPLI₁ and the axis $AXP_i$ of the track having the ordinal number i.

In order to be able to perform a valid reading of the data contained on the track of ordinal number i, for a maximum azimuth angle $\psi_M$, it is necessary that the ratio be as follows:

$$E_M + D/2 = L_p/2 \quad (1)$$

where $E_M$ is the maximum spacing tolerated for which the light spot SPLI₁ occupies the limit position POSL, where it is tangent to the edge BO of the track having the ordinal number i. In effect, since the tracks i, (i +1) on the one hand and i, (i −1) on the other are contiguous, the light spot SPLI₁ must not be allowed to partially cover the tracks next to ordinal number (i −1) or (i +1).

$$E = (L_p - D)/2 \quad (2)$$

It is also known that the optimal diameter D of the beam of light (the profile of luminous intensity of which is Gaussian) SPLI₁ is obtained with the formula $$D = 0.6 \lambda/NA \quad (3)$$

where $\lambda$ is the wavelength of the light beam and NA is the numerical aperture of the optical focusing device.

A justification of this formula can be found in the document entitled "Intermag 86 Tutorial Lectures", Phoenix, Apr. 13, 1986, by M. K. Haynes.

Thus if $\lambda = 0.82$ μm and NA $= 0.5$, then D becomes substantially equal to one micrometer.

Hence it is apparent that if $L_p$ is equal to 3 μm, then $E_M = 1$ μm.

In practice, it is preferable to use a value substantially less than $E_M$. Let $E_N$ be this value, such that EN +D/2 = $L_p/3$ (equation 4) (see FIG. 5). It will be appreciated that in that case the light spot SPLI₁ will occupy a preferred position POSP located substantially on the inside of the track i. This provides freedom from possible variations, which may be on the order of several tenths of a micrometer, in the position of the light SPLI₁ resulting from imprecision in the positioning of the position control system of the head TEMOI.

Accordingly, it is sufficient to replace $L_p/2$ in equation (1) with $L_p/3$, to obtain the following formula:

$$E_N = (2L_p - 3D)/6 \quad (5)$$

with $L_p = 3$ μm and D $= 1$ μm, one obtains:

$$E_N = 0.5 \mu m.$$

Referring now to FIG. 4, it is seen that:

$$E_N = d \times \sin \psi_M \quad (6)$$

hence:

$$d = E_N \sin \psi_m. \quad (7)$$

In conclusion, d is thus less than the value $E_M/\sin \psi_M$, and in practice, it will be selected that d $= E_N/\sin \psi_M$. Hence d is $<(L_p - D)/2 \sin \psi_M$ (7).

Preferably, d will be selected to equal:

$$(2L_p - 3D)/6 \sin \psi_M \quad (8)$$

Thus if $E_N = 0.5 \mu m$ and $\psi_M = 7°$, then d $= 4.1$ μm. If $\psi_M$ is equal to 14°, then d $= 2$ μm.

In practice, d will hence be selected to be between 2 and 4 micrometers.

To make the head TEMOI according to the invention, first the catamaran of silicon and the magnetic transducer TEMI₁ is made using masking and photolithography techniques, in the same manner as for the very large scale integrated circuit, for example in the manner described in French Patents 2 559 297 filed on Feb. 3, 1984, and 2 559 295 (corresponding to U.S. Pat. No. 4,698,716) filed on the same date. The magnetic transducer may have the structure defined in one of these patents. Once the magnetic transducer has been made, then the optical focusing device SOI₁ is applied. This device may be an integrated optical element on silicon. An optical element of this kind is described, for example, in document 21/85 of the Laboratoire D'Electronique et de Technologie de l'Informatique [Laboratory for Data Processing Elecronics and Technology]of the Atomic Energy Commission in Grenoble. The optical wave guide GOI₁ is applied after the writing pole POLI₁ has been applied, using the aforementioned techniques.

Hence it is apparent that the magnetic transducer TMI₁ and the optical focusing device SOI₁, as well as its exit wave guide $GOI_1$, are applied, or deposited, in successive layers. Quite clearly, an assembly comprising a magnetic transducer $TMI_2$ and an optical focusing device $SOI_2$ can be provided in the same manner on the second rail $PI_2$ of the catamaran serving as a support for the flying head TEMOI according to the invention. In this manner, the exit wave guide of the optical beam, contained in the reading layers, has its axis at a very slight distance d from the axis of symmetry $PSI_1$ of the magnetic writing pole $POLI_1$. The successive applications, or depositions, are effected in such a manner that the layers comprising the magnetic writing pole $POLI_1$ of the writing transducer are as close as possible to the layers comprising the exit wave guide of the optical focusing device $SOI_1$.

What is claimed is:

1. A magnetic writing and optical reading element adapted to fly above a magnetic data carrier, including at least two rails ($PI_1$, $PI_2$) and a groove disposed between them, and comprising at least one optical device ($SOI_1$, $SOI_2$) disposed on one of the rails ($PI_1$, $PI_2$) for focusing a beam of light ($SPLI_1$) on the carrier adapted to be used for reading data written upon said carrier;

one magnetic writing transducer ($TMI_1$, $TMI_2$) disposed on the said one rail ($PI_1$, $PI_2$), the optical device and the magnetic transducer ($TMI_1$) having the same longitudinal axis, and the optical device and the transducer are disposed in the immediate vicinity of one another, such that a distance d between an optical axis of the optical focusing device and a plane of symmetry ($PSI_1$) of a writing pole ($POLI_1$), perpendicular to the longitudinal axis, is less than a ratio of the difference between the width $L_p$ of the tracks of said magnetic data carrier to be written upon by the transducer and the diameter D of the spot of light produced by the focusing optical element ($SOI_1$, $SOI_2$), said diameter D to be taken at a surface of said magnetic data carrier, to twice the sine of the maximum azimuth angle $\psi M$.

2. An element as defined by claim 1, wherein the optical device ($SOI_1$, $SOI_2$) is provided with a wave guide ($GOI_1$, $GOI_2$), and the distance d between the optical axis of the beam of light produced by the exit wave guide and the plane of symmetry of the writing pole is less than or equal to the ratio of the difference between twice the width $L_p$ of the track and three times the diameter D of the beam of light to six times the sine of the maximum angle $\psi_M$.

3. An element as defined by claim 2, wherein the distance between the optical axis and the plane of symmetry of the writing pole is between 2 and 4 micrometers.

4. An element as defined by claim 1 wherein the magnetic writing transducer ($TMI_1$, $TMI_2$) is an integrated magnetic transducer made by very large scale integration techniques, the optical focusing device ($SOI_1$, $SOI_2$) being an optical element integrated on silicon made by very large scale integration techniques.

5. An element as defined by claim 4 wherein the integrated magnetic transducer and the integrated optical element are disposed at the rear of at least one of the two rails, the magnetic transducer being disposed upstream of the integrated optical element.

6. An element as defined by one of the claim 1 wherein the head is a silicon catamaran and the catamaran, the magnetic transducer, and the optical element are all integrated elements made by very large scale integration techniques.

7. An element as defined by claim 2 wherein the magnetic writing transducer ($TMI_1$, $TMI_2$) is an integrated magnetic transducer made by very large scale integration techniques, the optical focusing device ($SOI_1$, $SOI_2$) being an optical element integrated on silicon made by very large scale integration techniques.

8. An element as defined by claim 7 wherein the integrated magnetic transducer and the integrated optical element are disposed at the rear of at least one of the two rails, the magnetic transducer being disposed upstream of the integrated optical element.

9. An element as defined by claim 2 wherein the head is a silicon catamaran and the catamaran, the magnetic transducer, and the optical element are all integrated elements made by very large scale integration techniques.

10. An element as defined by claim 3 wherein the magnetic writing transducer ($TMI_1$, $TMI_2$) is an integrated magnetic transducer made by very large scale integration techniques, the optical focusing device ($SOI_1$, $SOI_2$) being an optical element integrated on silicon made by very large scale integration techniques.

11. An element as defined by claim 10 wherein the integrated magnetic transducer and the integrated optical element are disposed at the rear of at least one of the two rails, the magnetic transducer being disposed upstream of the integrated optical element.

12. An element as defined by claim 3 wherein the head is a silicon catamaran and the catamaran, the magnetic transducer, and the optical element are all integrated elements made by very large scale integration techniques.

* * * * *

UNITED STATES PATENT AND TRADEMARK OFFICE
CERTIFICATE OF CORRECTION

PATENT NO. : 4,893,207

DATED : January 9, 1990

INVENTOR(S) : MAURY et al

It is certified that error appears in the above-identified patent and that said Letters Patent is hereby corrected as shown below:

The patent date should be January 9, 1990, not January 9, 1989.

Signed and Sealed this

Nineteenth Day of March, 1991

Attest:

HARRY F. MANBECK, JR.

*Attesting Officer*  *Commissioner of Patents and Trademarks*